US008660056B2

(12) United States Patent
Tan et al.

(10) Patent No.: US 8,660,056 B2
(45) Date of Patent: Feb. 25, 2014

(54) FULL-RATE COOPERATIVE RELAY

(75) Inventors: Kun Tan, Beijing (CN); Jiansong Zhang, Beijing (CN); Yongguang Zhang, Beijing (CN); Ji-hoon Ryoo, GyondJu (KR); Ji Fang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 554 days.

(21) Appl. No.: 12/952,063

(22) Filed: Nov. 22, 2010

(65) Prior Publication Data

US 2012/0127914 A1  May 24, 2012

(51) Int. Cl.
*H04W 4/00* (2009.01)
*H04B 7/14* (2006.01)
*H04J 1/10* (2006.01)
*H04J 3/08* (2006.01)
*H04B 7/155* (2006.01)
*H04B 7/15* (2006.01)

(52) U.S. Cl.
CPC ........ *H04B 7/15521* (2013.01); *H04B 7/15592* (2013.01); *H04B 7/14* (2013.01); *H04B 7/15* (2013.01); *H04B 7/15528* (2013.01)
USPC .......................................... 370/315; 370/328

(58) Field of Classification Search
CPC ........ H04B 7/15592; H04B 7/14; H04B 7/15; H04B 7/15521; H04B 7/15528
USPC .................................. 370/315, 328
See application file for complete search history.

(56) References Cited

U.S. PATENT DOCUMENTS

| 7,706,283 | B2 | 4/2010 | Mehta et al. | |
|---|---|---|---|---|
| 7,720,020 | B2 | 5/2010 | Larsson | |
| 2005/0271019 | A1* | 12/2005 | Yuan et al. | 370/338 |
| 2008/0080436 | A1 | 4/2008 | Sandhu et al. | |
| 2008/0274692 | A1* | 11/2008 | Larsson | 455/24 |
| 2009/0233544 | A1 | 9/2009 | Oyman et al. | |

OTHER PUBLICATIONS

Agustin et al., "High Spectral Efficiency of Multiple-Relays Assisted Amplify-and forward Cooperative Transmissions under Spatial Reuse", retrieved at <<http://fireworks.intranet.gr/Publications/agustin_vidal_vtc07fall.pdf>>, Aug. 2, 2010.
Agustin, "Relay-assisted Transmission and Radio Resource Management for Wireless", retrived from <<http://www.recercat.net/bitstream/2072/8996/1/Extended_summary_Thesis_AAgustin.pdf>> on Aug. 2, 2010, pp. 1-pp.11.
Proakis, et al., Digital Communications, Fifth Edition, International Edition 2008, McGraw-Hill, 2008.

(Continued)

*Primary Examiner* — Ayaz Sheikh
*Assistant Examiner* — Tarell Hampton
(74) *Attorney, Agent, or Firm* — Carole A. Boelitz; Alin Corie; Micky Minhas

(57) ABSTRACT

Techniques and systems that improve throughput between a pair of nodes by using two multi-hop paths of one-way flows regardless of the one-way flows interfering with each other are described herein. These techniques enable nearly full-rate data flow through frame transmissions, even though these frame transmissions can interfere with substantially concurrent relay transmissions. In some implementations, relays on the two paths forward mixed frame signals to the next hop without trying to decode the mixed frame signals of interfered frames. The destination successfully recovers the useful information from the mixed frame signals by canceling out interference based on previously received frames.

20 Claims, 11 Drawing Sheets

(56) References Cited

OTHER PUBLICATIONS

Ding et al.,"A Novel Relay Assisted Cooperative Transmission Protocol for Wireless Multiple Access Systems", ACITA, 2008, <<http://www.usukita.org/files/Page203.pdf>> , pp. 203-pp. 208.
Katti, et al., Embracing Wireless Interference: Analog Network Coding, SIGCOMM 2007, Aug. 27-31, 2007, Kyoto Japan, 12 pages.
Lee et al., "Amplify-and-Forward Cooperative Transmission with Multiple Relays Using Phase Feedback", IEEE 2006, pp. 1-pp. 5.
Li et al., "Interference Cancellation in Multi-Access Wireless Relay Networks", retrieved at <<http://arxiv.org/PS_cache/arxiv/pdf/1004/1004.3807v1.pdf>> 2010, pp. 1-pp. 5.
Rt2x00 Project, <<http://rt2x00.serialmonkey.com/wiki/index.php/Main Page>>, last accessed on Jul. 19, 2010.
Tan, et al., Sora: High Performance Software Radio Using General Purpose Multi-core Processors, NSDI 2009, 6th USENIX Symposium on Networked Systems Design and Implementation, pp. 75-90.
Tourki et al., "Blind Cooperative Diversity with Multiple Relays", IEEE, 2008, pp. 731-pp. 735.

* cited by examiner

FULL-RATE COOPERATIVE RELAY

BACKGROUND

Traditionally, a relay may be used to extend communication range when the range of single-hop wireless communication is limited by distance or harsh radio propagation conditions. Such relays build a multi-hop path between an out-of range node and an access point. The frames are forwarded hop-by-hop from the source to the destination. However, to avoid self-interference, transmission on different hops cannot be activated simultaneously when the nodes are within direct communication range. Consequently, the decrease in throughput over multi-hop paths is inversely proportional to the number of hops between the sender and the destination. For example, in a two-hop path with a single relay, throughput from the sender to the destination is only half of the data rate compared to a single hop wireless link.

For example when a source sends four frames to a destination with a traditional multi-hop relay system using two relays, the source sends each packet to one of the relays and waits for the relay to forward the packet to the destination since the two relays can interfere with each other. Thus, typically, to send four frames requires eight time slots.

SUMMARY

Described herein are techniques and corresponding systems implementing techniques that improve throughput between a pair of nodes by using two multi-hop paths of one-way flows regardless of the one-way flows interfering with each other. These techniques enable nearly full-rate data flow through frame transmissions, even though these frame transmissions can interfere with substantially concurrent relay transmissions. In some implementations, relays on the two paths forward mixed frame signals to the next hop without trying to decode the mixed frame signals of interfered frames. The destination successfully recovers the useful information from the mixed frame signals by canceling out interference based on previously received frames.

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Overview

Figure 1:
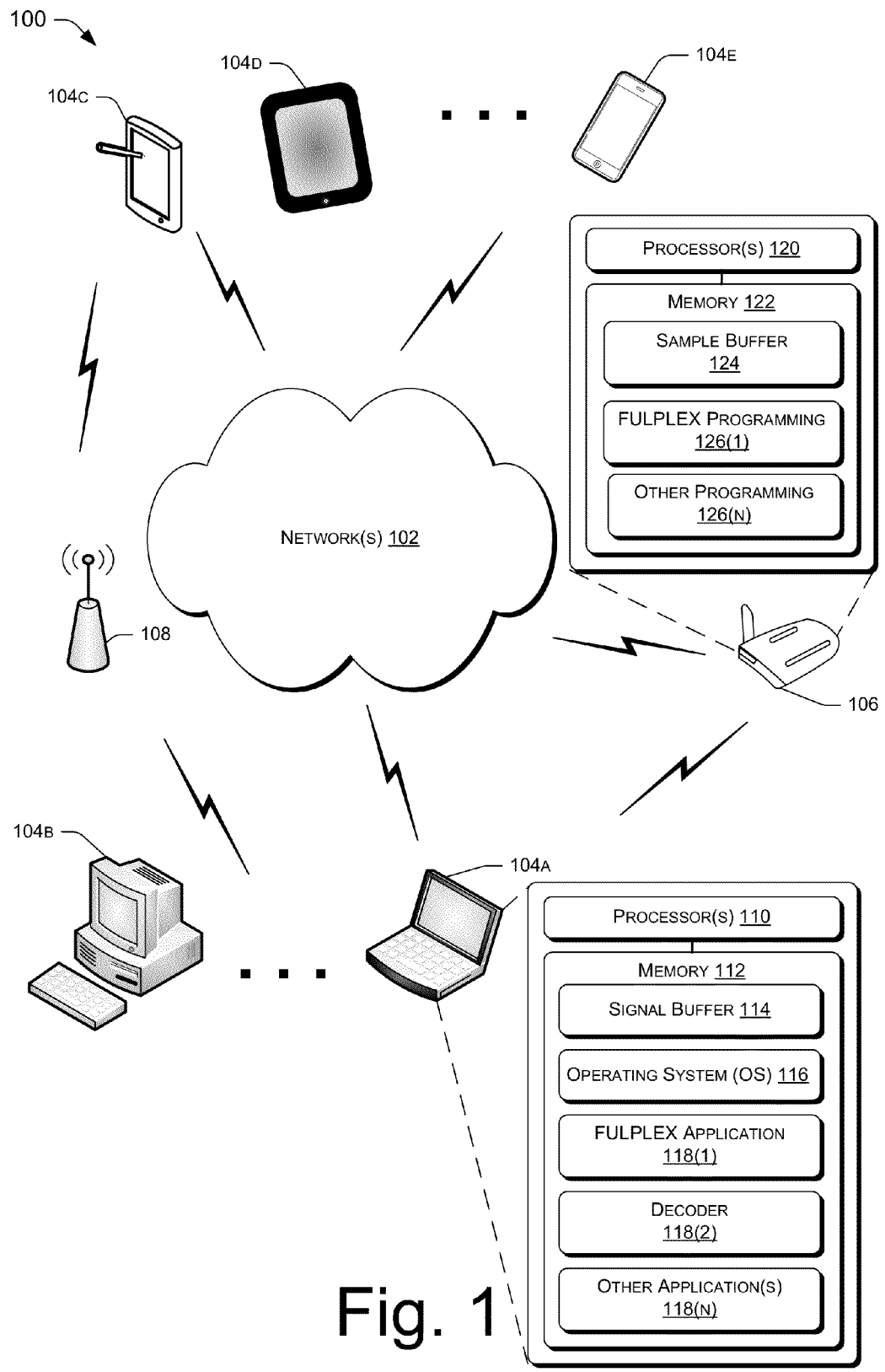
FIG. 1 illustrates an example architecture including a hardware and logical configuration of a computing device according to some implementations.

The disclosure describes techniques utilizing two multi-hop paths of one-way flows regardless of the paths interfering with one another. The techniques improve throughput between a pair of nodes by leveraging interference when it occurs. For instance, a source node can transmit frames, also called source frames, substantially continuously to achieve nearly full data rate even though the transmissions can interfere with substantially concurrent relay transmissions. Relays on the two paths forward interfered frame signals as a mixed frame to a next hop without decoding the interfered frame signals. When the receiver receives such a mixed frame, useful information may be recovered by canceling out interference based on previously received frame signals. Herein such an approach may be called FULPLEX.

In some implementations, to ensure effective interference cancelation at the receiver, wireless channel information is precisely tracked. For example, when relaying along multi-hop paths, the frame will travel on multiple different wireless channels, and each channel randomly attenuates and distorts the frame signal. The techniques discussed herein leverage a preamble scheme called "onion preambles." Onion preambles are tagged at each hop to record channel states. The destination can effectively use these preambles to reconstruct channel information when performing interference cancelation.

In addition, in some implementations the protocol for a cooperative relay in a wireless network as described herein ensures substantially concurrent transmissions are mixed in such a way that the destination can estimate wireless channel attenuation and reliably perform interference cancelation. Thus, the protocol effectively coordinates the transmissions among the source and the relays to control the interference pattern, leading to a substantially full-rate cooperative relay scheme. The techniques discussed herein represent a cooperative medium access control (MAC) protocol called "chain access." Chain access schedules a chain of co-operative relays to transmit substantially simultaneously. Chain access is a distributed protocol, meaning that different source-destination pairs are complete and schedule their transmissions independently.

Several implementations of FULPLEX, a cooperative relay in a wireless network described herein, make use of a programmable software-defined radio platform operated over a network conforming to the IEEE 802.11b standard. The techniques and such a platform are designed to be compatible with the set of IEEE 802.11 standards such as 802.11a, 802.11g, and 802.11n. However the techniques are not limited to implementations conforming to these standards, and other embodiments including a cooperative relay architecture to improve throughput between other multi-hop connected nodes are contemplated.

In one specific example of many, nearly full-rate throughput is achieved via the cooperative relay in a wireless network by using two potentially mutually interfering paths. The FULPLEX techniques leverage onion preambles and chain access to enable a destination to reliably cancel interference and reliably decode frames from mutually interfering paths.

The discussion below begins with a section entitled "Example Computing Architecture," which describes one non-limiting environment that may implement the described techniques. Next, a section entitled "Example Data Flow" presents several examples of data flow for cooperative relay. A third section, entitled "Example Preambles" describes several examples of preambles implemented for cooperative relay. A fourth section, entitled "Example Processes" presents several example processes for cooperative relay. A brief conclusion ends the discussion.

This brief introduction, including section titles and corresponding summaries, is provided for the reader's convenience and is not intended to limit the scope of the claims, nor the proceeding sections.

Example Computing Architecture

FIG. 1 illustrates an example computing architecture 100 that may implement techniques for facilitating cooperative relay in a network 102 including FULPLEX, which for example, represents a technique for full-rate cooperative relay in a wireless network. The architecture 100 may include a variety of computing devices 104 as source and/or destination devices, relays 106, and wireless access points 108. As illustrated, the computing device 104A includes one or more processors 110 and memory 112, which may include a signal buffer store 114, an operating system 116, and one or more applications including a FULPLEX application 118(1), a decoder 118(2), and other applications 118(N) running thereon. In the illustrated example, relay 106 includes one or more processors 120 and memory 122, which may store a sample buffer 124, FULPLEX programming 126(1), and one or more other instances of programming 126(2), . . . , 126(N).

While FIG. 1 illustrates the computing device 104A as a laptop-style personal computer, other implementations may employ a personal computer 104B, a personal digital assistant (PDA) 104C, a thin client 104D, a mobile telephone 104E, a portable music player (not shown) or any other sort of suitable computing device. The memory 112, meanwhile, may include computer-readable storage media in the form of volatile memory, such as Random Access Memory (RAM) and/or non-volatile memory, such as Read Only Memory (ROM) or flash RAM.

The applications 118(1)-(N) may comprise desktop applications, web applications provided over a network such as network 102, and/or any other type of application capable of running on the computing device 104. The network 102, meanwhile, may represent a combination of multiple different types of networks, interconnected with each other and functioning as a single large network (e.g., the Internet or an intranet). The network 102 may include wire-based network components (e.g., cable) and wireless network components (e.g., cellular, satellite, etc.).

In several FULPLEX implementations, for communication via wireless networks, the source computing device 104 uses physical layer (PHY) coding and modulation to modulate frames into wireless signals, e.g., IEEE 802.11 signals. In at least one instance, the source computing device 104 may transmit frames in a batch. When the source computing device 104 accesses a wireless channel, the source computing device 104 continues to transmit frames in the batch using the "chain access" MAC protocol, and to wait for an acknowledgement (ACK) from the destination of the frames, which may be an end destination 104, a relay 106, or a wireless access point 108. The ACKs are sent when the destination receives the entirety of the batch of frames, and since ACKs are small, may be transmitted using a traditional multi-hop relay scheme. When the source computing device 104 receives the acknowledgement, it will create a new batch, containing both retransmissions for the last batch (if any) and new frames, thus effecting continuous transmission.

Relays, e.g. relays 106, which in various embodiments may be an access point, router, or computing device such as a laptop, personal digital assistant (PDA), smart phone, cell phone, etc., receive frames and forward them out to the next hop. Unlike conventional multi-hop forwarding, where only successfully decoded frames are remodulated and forwarded, the cooperative relay techniques described herein facilitate a FULPLEX programmed relay 106 forwarding raw signals that the relay 106 received in the previous time slot. Each relay 106 employs the sample buffer 124 to hold the received signal. When a FULPLEX relay 106 detects a frame transmission, it records the raw signal to the sample buffer 124. The relay 106 decodes a FULPLEX header, e.g., a small leading header, to identify the frame. The relay 106 does not decode the whole frame. Although the relay may also be configured to decode the whole frame in some embodiments. Before forwarding, the relay 106 amplifies the stored signals and attaches a new preamble. The new preamble enables the FULPLEX system to track the wireless channel the frame will traverse. For example, the new preamble enables a FULPLEX programmed destination 104 to track wireless channel distortion.

A destination device 104, such as destination device 104C, receives signals, the destination device 104 allocates an array of signal buffers 114 to store the raw signals received in the same batch. When a new frame is received, the destination device 104 cancels self-interference using previously received signals. This enables decoding the new frame. After a batch of frames has been received, the destination 104 generates an acknowledgement to the source 104 using conventional multi-hop relaying to report the successfully received batch.

Example Data Flow

Compared to the number of time slots, m, that are needed to send a number of frames, n, in traditional multi-hop relay systems, FULPLEX techniques significantly reduce the number of time slots, m, needed to send the same number of frames, n.

FIGS. 2A-2F illustrate an example 200 of a full-rate cooperative relay in a wireless network showing data flow between a pair of nodes by using two multi-hop paths of one-way flows, e.g., a FULPLEX transmission schedule.

Figure 2B:
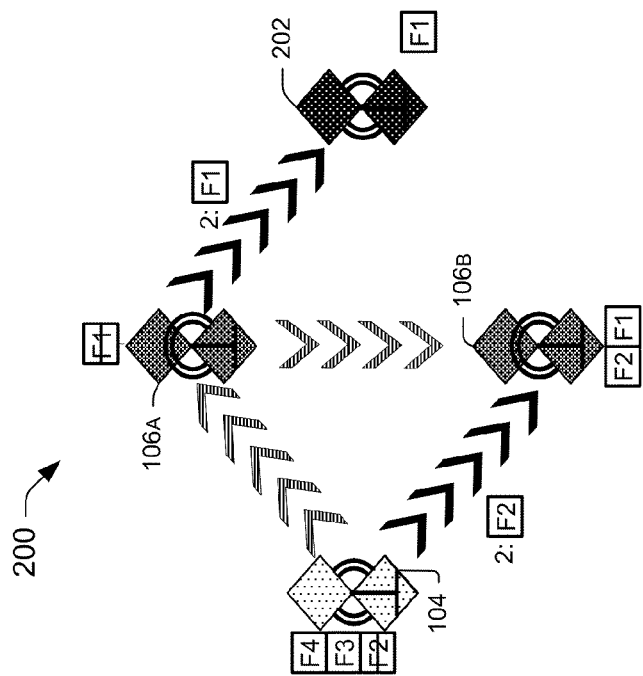
FIGS. 2A-2F illustrate an example of full-rate cooperative relay in a wireless network showing data flow between a pair of nodes by using two multi-hop paths of one-way flows.
Figure 2A:
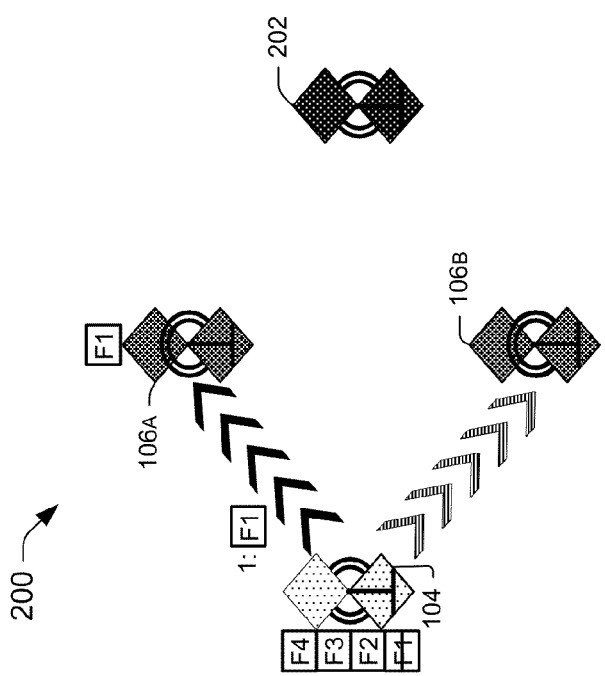

As shown in FIG. 2A, initially during a first time slot, a source device 104 sends a first frame, F1, toward a destination 202 via relay 106A. Destination 202 may represent any of devices 104 as discussed above regarding FIG. 1. Due to the broadcast nature of the transmission, the frame signal is also received by devices within interference range, such as relay 106B. Relays 106 employ a sample buffer 124 to store received signals. The raw signal is recorded to the sample buffer 124 when the relay 106 detects a frame transmission.

FIG. 2B illustrates relay 106A forwarding frame F1 to destination 202 in a second time slot, meanwhile source 104 transmits a second frame, F2, to relay 106E also in the second time slot. Since the destination 202 is outside of interference range from the source 104, destination 202 receives a non-interfered signal containing frame F1 forwarded by relay 106A. However, relay 106B, which is within interference range of relay 106A as well as source 104, receives an interfered signal of mixed frames including frames F1 and F2 (F1+F2). In several implementations FULPLEX relays 106 may be configured to either send or receive, but not both in a single time slot. For example, although relay 106A is within interference range of the transmission of frame F2 from source 104 during the second time slot, by virtue of relay 106A sending frame F1 to destination 202, relay 106A does not receive frame F2 in the second time slot. In alternate embodiments, FULPLEX relays 106 may be configured to both send and receive in the same time slot. In such an example, relay 106A may be configured to maintain F1 while adding F2 to an array in the sample buffer 124.

Figure 2D:
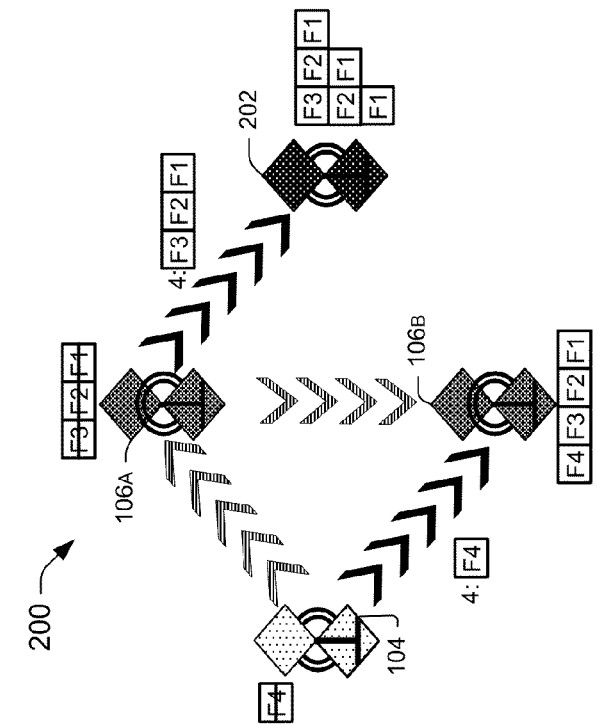
Figure 2C:
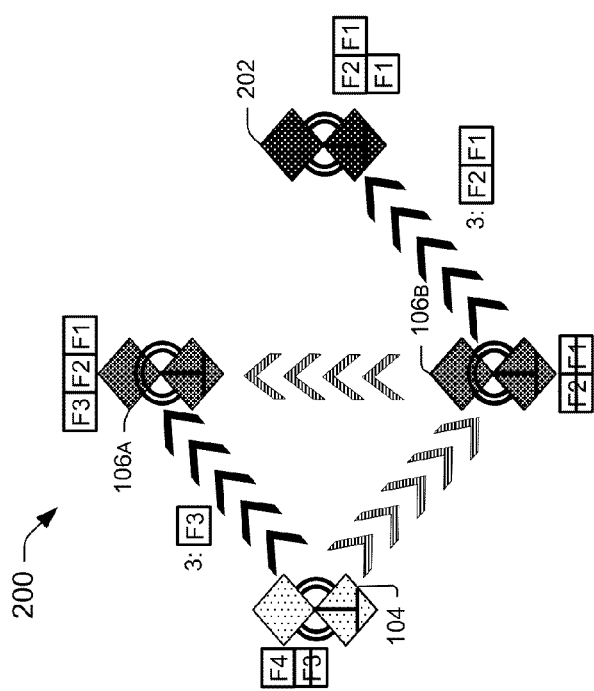

FIG. 2C illustrates the status of the example system during a third time slot. In the third time slot relay 106E forwards mixed frame F1+F2 to destination 202 while source 104 transmits a third frame, F3 to relay 106A. Relay 106E forwards the received PHY signals of F1 and F2 without decoding the signals. Relay 106A, which is within interference range of relay 106E and source 104, receives a mixed signal including the forwarded PHY signals of F1 and F2 from relay 106B as well as frame F3 from source 104. Destination 202, upon receiving the forwarded PHY signals of F1 and F2 from relay 106B, uses previously received frame F1 to cancel F1 from the mixed signal, rather than attempting to decode the mixed signal F1+F2 directly.

FIG. 2D illustrates relay 106A forwarding mixed frame F1+F2+F3 to destination 202 while source 104 transmits a fourth frame, F4 to relay 106E in a fourth time slot. In the illustrated example, the fourth frame, F4 is the last frame in the batch that source 104 is transmitting. Relay 106A forwards the received PHY signals of F1, F2, and F3 without decoding the signals. Relay 106E receives a mixed signal including the forwarded PHY signals of F1, F2, and F3 from relay 106A as well as frame F4 from source 104. Destination 202 upon receiving the forwarded PHY signals of F1, F2 and F3 from relay 106A, uses previously received mixed frame F1+F2 to cancel F1+F2 from the mixed signal, rather than attempting to decode the mixed signal F1+F2+F3 directly.

Figure 2F:
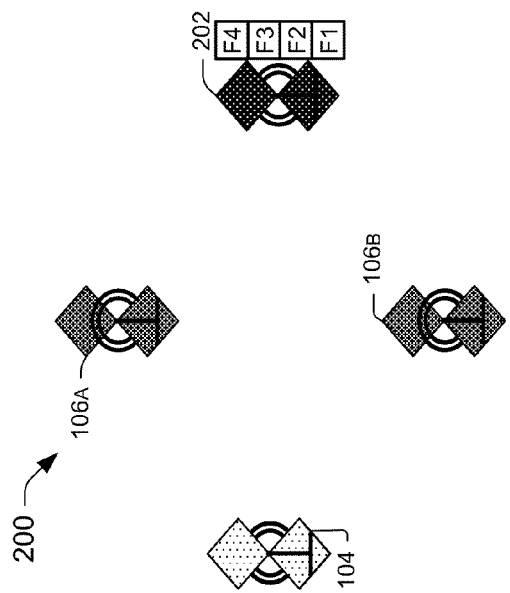
Figure 2E:
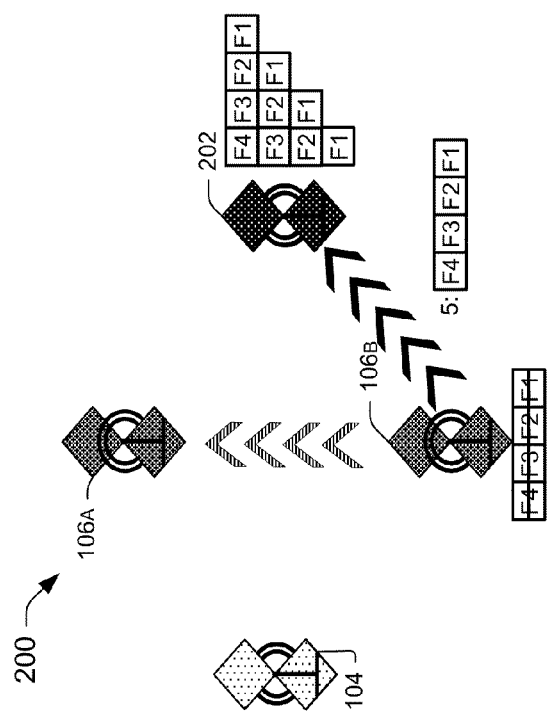

FIG. 2E illustrates relay 106E forwarding mixed frame F1+F2+F3+F4 to destination 202 and relay 106A in a fifth time slot. As discussed above, relay 106B forwards the received PHY signals of F1, F2, F3, and F4 without decoding the signals. Destination 202, upon receiving the forwarded PHY signals of F1, F2, F3, and F4 from relay 106B, uses previously received mixed frame F1+F2+F3 to cancel F1+F2+F3 from the mixed signal, rather than attempting to decode the mixed signal F1+F2+F3+F4 directly. The series of cancelations allow the destination to decode the four frames as shown in FIG. 2F.

As shown in the example illustrated in FIGS. 2A-2F, four frames may be transmitted in five time slots when using the techniques described herein. In the illustrated example, this represents a 70% decrease from the eight time slots needed in traditional multi-hop relays. More generally, FULPLEX techniques for full-rate cooperative relay in a wireless network transmit n frames over two two-hop relay paths in m=(n+1) time slots. FULPLEX is termed a full-rate cooperative relay scheme since the source 104 transmits a new frame at each time slot.

Figure 3:
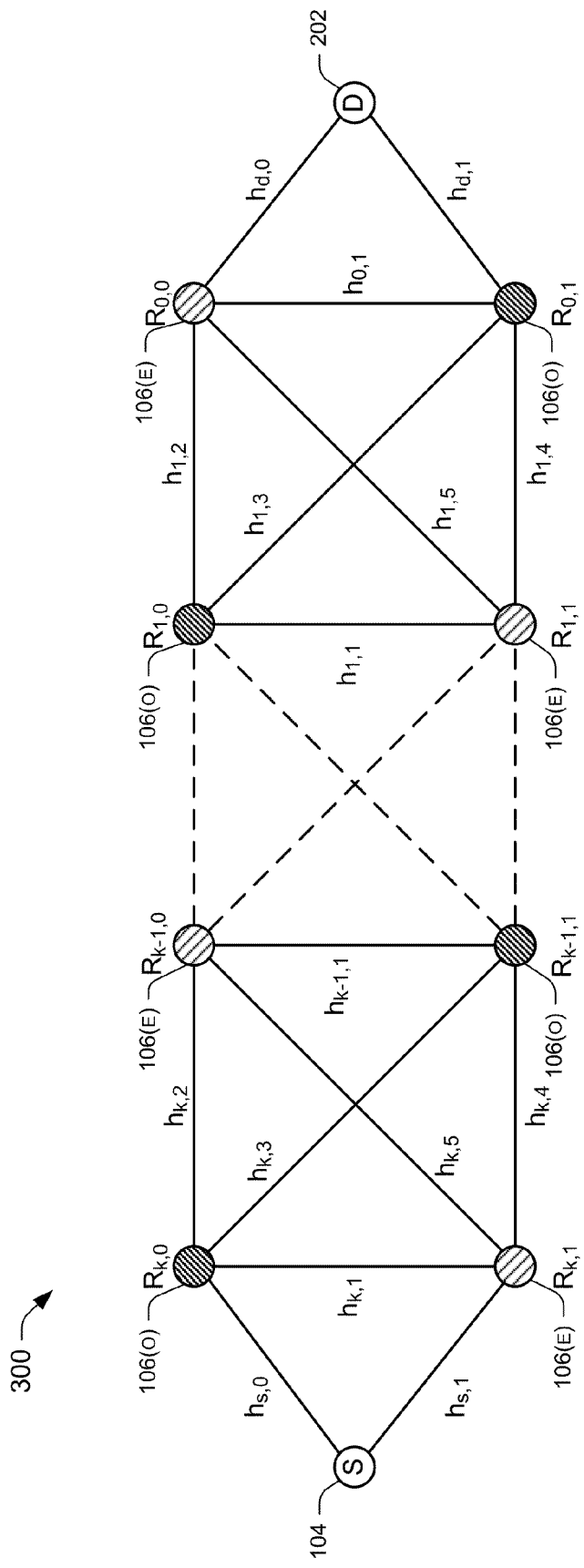
FIG. 3 illustrates an example of how the techniques control the self-interference pattern along two multi-hop paths in some implementations.

FIG. 3 illustrates several details addressing challenges of implementing full-rate cooperative relay in a wireless network that were omitted from the discussion of FIGS. 2A-2F above.

A wireless signal is distorted and attenuated when the signal passes a wireless channel, which presents a challenge. This is particularly true in a multi-hop environment, such as that shown at 300, where the same wireless signal may pass multiple different wireless channels and be distorted many times. In the examples described herein, in order to cancel the interfering signals, the destination 202 learns the wireless channels to compensate for their effects. Thus, FULPLEX employs a new distributed preamble scheme developed to track the complex channel structure in multi-hop relay paths.

A second challenge is that in a conventional wireless medium access control (MAC) protocol, e.g. IEEE 802.11, each node independently and randomly contends for transmission. A new cooperative path access control protocol, "chain access" MAC, enables FULPLEX, where the relays along the two multi-hop paths cooperatively control the interference pattern. The FULPLEX protocol leverages existing wireless local-area network (WLAN) coordination mechanisms such as carrier-sensing and broadcasting to distributively coordinate transmissions.

FULPLEX adopts an event-trigger approach to schedule transmission along two paths in the chain access MAC.

FIG. 3 shows two (k+2) hop paths within interference range of each other, although a greater number of paths may exist. The two paths connect the source 104 and destination 202. In FIG. 3, a relay 106 is labeled with $R_{i,j}$, where j=0, 1 shows the path to which the relay 106 belongs, and the relay 106 is i+1 hops away from the destination 202. In at least one implementation, a relay 106 is considered a member of a first group of relays 106(O), called the "odd-numbered relays," when the sum of its subscripts, e.g., (i+j) produces an odd value and the relay 106 is considered a member of a second group of relays 106(E), called "even-numbered relays," when the sum of its subscripts produces an even value.

As shown in FIG. 3, the source node 104, initiates a batch transmission by delivering a packet over the first hop. The first relay on each path, e.g., $R_{k,0}$ and $R_{k,1}$, at 106(O) and 106(E), respectively, forwards the packet alternately. Subsequent transmissions may be pipelined, which means that a preamble sent by the current forwarder triggers the forwarding behavior of a relay from the previous hop of the other path, e.g., $R_{k,0}$ at 106(O) triggers $R_{k-1,1}$ at 106(O). Such a trigger scheduling creates the self-interference pattern illustrated in FIG. 3.

FULPLEX trigger scheduling is effective with little or no more than coarse-grained, packet-level synchronization among neighboring relays. Even high-performance software radios, such as Sora, for example, take several µs processing time to decode the triggering preamble. However, compared to the packet length, the latency of µs processing time represents negligible overhead. In addition, raw samples are scaled and forwarded directly, which keeps sample-processing delay at the relay nodes to a minimum. Moreover, the source node can modulate new packets in parallel with transmission.

In various embodiments, FULPLEX uses the following rules to control cooperative forwarding among relays:
  All relays in the same group, e.g., with the same oddetivty, transmit concurrently;
  Relays in opposing groups transmit at alternate times, e.g., odd numbered relays and even numbered relays transmit alternatively;
  The source transmits a new frame each time slot.

In the example shown at 300, odd numbered relays 106(O) include darker cross-hatching, while even numbered relays 106(E) include lighter cross-hatching. At each hop, in each pair of relays (e.g., 106(O) and 106(E)), when the odd-numbered relay 106(O) is receiving the even-numbered relay 106(E) is forwarding. Or, the even-numbered relay 106(E) is receiving and the odd-numbered relay 106(O) is forwarding.

FULPLEX takes advantage of the source 104 transmitting a new frame at each time slot in order to accomplish full-rate forwarding. However, these transmissions interfere with other forwarding signals transmitted by neighboring relays 106. Such substantially concurrently transmitted signals are superposed at the receiving relays 106 at the next hop. Superposition means that the signals are layered whether partially or fully overlapping, resulting in a mixed signal. Then, these mixed signals are further recorded and forwarded in the next time slot and further superposed with other forwarding signals. This creates a complex interference pattern at the destination 202, where the useful information is deeply mixed with multiple interfering signals. At the destination 202, the interference signals are removed using a recursive algorithm, and the leftover signal will contain one residual frame. As described herein, FULPLEX employs such a recursive algorithm to remove interference signals. In at least one embodiment, the residual frame is decoded using decoder 118(2). In at least one other embodiment, the residual frame is decoded using a conventional decoder.

Before describing the decoding algorithm at the destination 202, consider the signal received at the destination 202 after FULPLEX forwarding, using the two-hop path scenario from FIG. 2 as an example. For the sake of clarity, the relays 106A and 106E from FIG. 2 may be thought of as $R_{0,0}$ and $R_{0,1}$, as shown in FIG. 3.

A signal forwarded by relay $R_{i,j}$ at time t, is denoted $s_{i,j}(t)$, and the signal received by $R_{i,j}$ at time t is denoted $r_{i,j}(t)$. In accordance with the FULPLEX protocol, relays 106 do not decode the received signal; instead the signal is amplified and forwarded. Thus, with $\alpha_{i,j}(t)$ as a scaling factor, Equation 1 is obtained. However, the scaling factor may be omitted from the calculations for ease of understanding.

$$s_{i,j}(t) = \alpha_{i,j}(t) r_{i,j}(t-1) \quad (1)$$

The signal received by the destination at time t is denoted d(t). Thus, Equation 2 follows.

$$d(t) = \begin{cases} h_{d,0} s_{0,0}(t), & t = 2m \\ h_{d,1} s_{0,1}(t) = 2m+1 \end{cases} \quad (2)$$

At time slot t=2m−1, relay $R_{0,0}$, receives a superposition of signals transmitted simultaneously by relay R0,1 and the source. Equation 3 represents the superposed signal that is received.

$$r_{0,0}(2m-1) = h_{s,0} f(2m-1) + h_{0,1} s_{0,1}(2m-1) \quad (3)$$

In addition, equation 4 is derived using equation 2.

$$d(2m) = h_{d,0} r_{0,0}(2m-1) \quad (4)$$
$$= (h_{d,0} h_{s,0}) f(2m-1) + (h_{d,0} h_{0,1} h_{d,0}^{-1}) d(2m-1)$$

Equation 4 suggests that in two-hop paths, the signal currently received at the destination 202 is a sum of a new frame f(2m−1) and the signal the destination 202 received in the last time slot, d(2m−1). Thus, with a knowledge of the channel parameters, d(2m−1) is canceled from the currently received signal d(2m). A residual signal containing only f(2m−1) remains. Accordingly, destination 202 may pass f(2m−1) to a decoder 118(2), or to a conventional decoder to decode information bits from frame f(2m−1). Similar results are obtained when t=2m.

The operation of canceling signal x from y is denoted "y~x," and "y⇔x" denotes when x and y differ by a channel factor. Thus, Equation 5 represents a two-hop path such as the path illustrated in FIGS. 2A-2F.

$$f(t-1) \Leftrightarrow d(t) \sim d(t-1) \quad (5)$$

FULPLEX equations representing three-hop paths follow as shown in equation 6, below.

$$d(2m) = h_{d,0} r_{0,0}(2m-1) \quad (6)$$
$$= (h_{d,0} h_{0,1}) s_{0,1}(2m-1) + (h_{d,0} h_{1,2}) s_{1,0}(2m-1)$$
$$= (h_{d,0} h_{0,1} h_{d,1}^{-1}) d(2m-1) + (h_{d,0} h_{1,2}) r_{1,0}(2m-2)$$

The three-hop path equations result in equations 7 and 8, below.

$$r_{1,0}(2m-2) \Leftrightarrow d(2m) \sim d(2m-1) \quad (7)$$

$$r_{1,1}(2m-3) \Leftrightarrow d(2m-1) \sim d(2m-2), \quad (8)$$

and, $$f(2m-2) \Leftrightarrow r_{1,0}(2m-2) \sim r_{0,0}(2m-3) \sim r_{1,1}(2m-3)$$

$$f(2m-3) \Leftrightarrow r_{1,1}(2m-3) \sim r_{0,1}(2m-4) \sim r_{1,0}(2m-4).$$

Alternately, three-hop paths may be written as equation 9, where j∈ {0, 1} and δ=1−j. Hence, $R_{i,\delta}$ denotes the relay that has the same hop identity i with $R_{i,j}$, but on the opposite path.

$$f(t-2) \Leftrightarrow r_{1,0}(t-1) \sim r_{0,j}(t-2) \sim r_{1,\delta}(t-2) \quad (9)$$

Similar recursive equations represent general (k+2)-hop paths such as the five-hop paths illustrated in FIG. 3. The received signal at relay $R_{i,j}$, i∈ {0,1, ... k}, j∈ {0,1} at each time slot can be recursively calculated as shown in equation 10, below.

$$r_{0,j}(t-1) \Leftrightarrow d(t)$$

$$r_{1,j}(t-2) \Leftrightarrow r_{0,j}(t-1) \sim r_{0,\delta}(t-2)$$

$$r_{i,j}(t-i-1) \Leftrightarrow r_{i-1,j}(t-i) \sim r_{i-2,j}(t-i-1)$$

$$\sim r_{i-1,\delta}(t-i-1), \forall k: 2 \leq i \leq k$$

$$f(t-k-1) \Leftrightarrow r_{k,j}(t-k) \sim r_{k-1,j}(t-k-1) \sim r_{k,\delta}(t-k-1) \quad (10)$$

Note the signals $r_{i-1,\delta}(t-i-1)$ are from the intermediate decoding results of previous slot, which are generated by the concurrent transmission of nodes with a different odevity.

Equation 10 directly implies the decoding algorithm for FULPLEX in a k-hop network. For each received signal, the destination 202 only needs to successively perform 2(k+1)−1=2k+1 times signal cancelation. Then, the residual signal contains only f(t−k−1), so that the residual signal is decodable using a wireless decoder 118(2), which in some instances represents a conventional decoder.

Table 1, below, shows pseudo-code for implementing the FULPLEX decoding algorithm at a destination 202.

TABLE 1

1: Decode new signal at time t:
2: Receive new compound signal d(t)
3: $r_{0,j}(t-1) \leftarrow d(t)$
4: $r_{1,j}(t-2) \leftarrow$ SignalCancellation($r_{0,j}(t-1), r_{0,\delta}(t-2)$)
5: for i = 2; i≤k + 1; i ++ do
6: y' ← SignalCancellation($r_{i-1,j}(t-i), r_{i-2,j}(t-i-1)$)
7: y ← SignalCancellation(y', $r_{i-1,\delta}(t-i-1)$)
8: end for
9: f (t − k − 1) ← y
10: Pass f (t − k − 1) to a normal decoder For (k+2)-hop paths, the destination 202 allocates a signal buffer array in a signal buffer 114 that stores the intermediate decoding results of the previous two time slots, i.e., the signals $r_{i,j}(t-i-1)$ and $r_{i,j}(t-i-2)$. When a new signal is received from relays 106, the destination 202 cancels the signals stored in its buffer 114 as shown in lines 5-9 of Table 1. In at least one embodiment, the residual signal is passed to frame decoder 118(2), which in some instances represents a conventional frame decoder.

When a signal passes a wireless channel, it is distorted and attenuated. Different wireless channels will distort and attenuate the same signal differently. Thus, two received versions of the same signal cannot be canceled directly. To better understand this issue, consider the two-hop path discussed above with regard to FIGS. 2A-2F as an example using the notation from FIG. 3. As shown in Equation 6, the version of $s_{0,1}$ (2m−1) superposed in d(2m) passes two wireless channels, $h_{0,1}$ and $h_{d,0}$; while d(2m−1) contains another version of $s_{0,1}$ (2m−1) that passes a different channel, $h_{d,1}$. Thus, in order to cancel signal $s_{0,1}$ (2m−1), the destination 202 first aligns these two versions contained in d(2m−1) and d(2m).

One naïve solution is to collect parameters for each individual wireless channel, i.e. $h_{i,j}$, and report them to the destination 202. Then, the destination 202 may reverse the channel effects on the signal one-by-one before cancelation. However, such a solution is impractical because wireless channels are time-varying, making it impractical for a destination 202 to track each individual wireless channel. FULPLEX does not track each wireless channel individually. Instead, FULPLEX exploits a preamble scheme to track the overall distortions when a signal passes multiple channels. Since the relays 106 in FULPLEX keep the originally received signals and forward them with only linear amplification, when the signal passes a wireless channel, the channel effects are "remembered" in the preambles. Such "memories" in the preambles may be used to align different signal versions for cancelation.

However, FULPLEX contains a complex self-interference pattern, and the interference on these preambles will eventually destroy the "memories" of the wireless channel without taking further action. Thus, FULPLEX was designed with a distributed preamble scheme to ensure interference-free preambles for use in successive signal cancelation. An example of such a preamble scheme, called onion preambles, is presented in the next section.

Example Preambles

Figure 4:
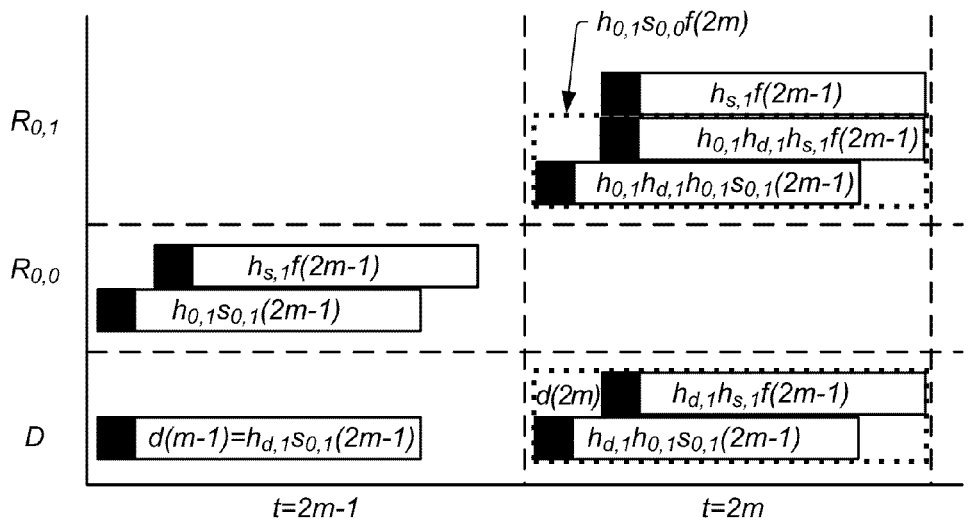
FIG. 4 illustrates an example of onion preambles on two-hop paths in some implementations.

FIG. 4 shows a snap-shot of the transmissions at time slot (2m−1) and 2m. At time slot (2m−1), $R_{0,1}$, e.g., a relay 106, forwards signal $s_{0,1}$(2m−1), and concurrently the source 104 also sends frame f(2m−1). In FULPLEX, these two transmissions are controlled not to overlap exactly. Instead, the source 104 delays its transmission until after the end of the preamble of $s_{0,1}$(2m−1). Thus, another relay 106, $R_{0,0}$, receives a mixture of $s_{0,1}$(2m−1) and f(2m−1) that are overlapped. At time slot 2m, relay 106, $R_{0,0}$ forwards the received signal after amplification and the destination 202 receives the signal as d(2m), which contains the same two-layer preamble structure. Thus, the destination 202 can use the first preamble in both d(2m) and d(2m−1) to align d(2m−1) and the bottom layer signal of d(2m), and cancel d(2m−1) from d(2m). The residual signal contains f(2m−1) and it also contains another preamble, which is used by the PHY decoder, e.g., 118(2), as shown in FIG. 1, to decode the frame. Note that the second preamble is actually superposed with the data portion of signal $s_{0,1}$ (2m−1). The second preamble becomes clean after $s_{0,1}$(2m−1) is canceled out at the first layer. Like an onion, the destination 202 peels away, e.g., cancels, the interfering signals layer-by-layer with the help of preambles at each layer. This preamble structure is given the name "onion preambles" to emphasize the function of the structure.

There is one more issue for the onion preamble scheme. As shown in FIG. 4, assuming each relay has a fixed transmission power, at each forwarding the signal preamble is attenuated. For example, at time slot (2m−1), when the power of the preamble equals the average power for the frame $s_{0,1}$(2m−1), then at R0,0, the signal is mixed with another frame f(2m−1) and the power ratio between preamble and frame average may be halved. This means the power used to transmit a preamble may be only half of the average power of the whole frame signal. Further, the power ratio is reduced to ⅓ at time slot 2m, when the signal is further mixed with new frame f(2m) at R01. Such decay is exponential. So after a small number of time slots, the preamble may have a very low signal-to-noise-ratio (SNR) that will greatly reduce the signal cancelation performance. The issue of decay is addressed with a two-preamble scheme.

Figure 5:
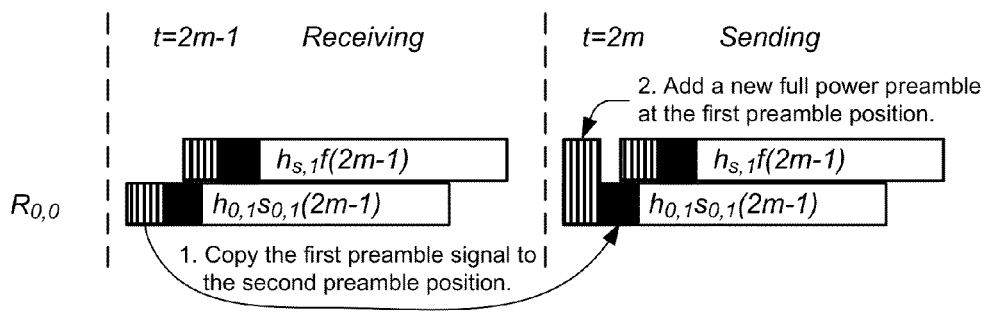
FIG. 5 illustrates an example of a two preamble scheme to prevent exponential decay of preamble power as employed in some implementations.

As shown in FIG. 5, two preambles are attached before any frame transmission. For example, before a relay 106 forwards the signal received in last time slot, the relay 106 first copies the preamble at the first position to the second preamble position and then replaces the first preamble position with a new full power preamble. Thus, the power level of the preamble maintains the same after a limited number of relays. Such a two-preamble scheme is beneficial in various embodiments because the destination 202 will use the preamble at the second position to cancel d(2m−1).

As mentioned earlier, an equalizer is a linear filter c={c−L, . . . , cL} that reverses the impact of multi-path wireless channel. Mathematically, an optimal equalizer minimizes the difference between the recovered signals and the signal that is transmitted, as:

$$c = \arg\min_c \|x - c^* y\|,$$

where x is the transmitted signal, y is the received signal, $\|.\|$ represents the 2-norm, and "*" is the convolution operation. To obtain each component value of c, the destination uses the known preamble to train the equalizer with an adaptive searching algorithm. FULPLEX uses a fractional spaced equalizer (FSE) that works on oversampling rate, i.e., four times oversampling rate.

Figure 6:
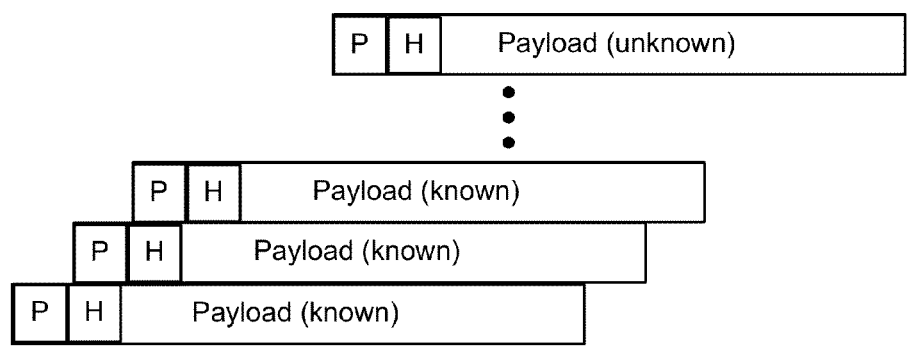
FIG. 6 illustrates an example of staggered overlap of frames transmitted by the sender and a relay in some implementations.

FIG. 6 illustrates that to enable successive interference cancelation, the transmission of cooperative relays 106 and the sender 104 are coordinated. These frames are staggered by the sender 104 overhearing the transmission of the relay 106 and delaying transmission of a new frame until just after each of the preambles of previous frames have already passed.

Example Processes

FIGS. 7-11 comprise flow diagrams illustrating example processes 700, 800, 900, 1000, and 1100 for full-rate cooperative relay in a wireless network consistent with FIGS. 1-6. The processes are illustrated as collections of acts in a logical flow graph, which represents a sequence of operations that can be implemented in hardware, software, or a combination thereof. In the context of software, the blocks represent computer instructions stored on one or more computer-readable media that, when executed by one or more processors, perform the recited operations. Note that the order in which the process is described is not intended to be construed as a limitation, and any number of the described acts can be combined in any order to implement the process, or an alternate process. Additionally, individual blocks may be deleted from the process without departing from the spirit and scope of the subject matter described herein.

Figure 7:
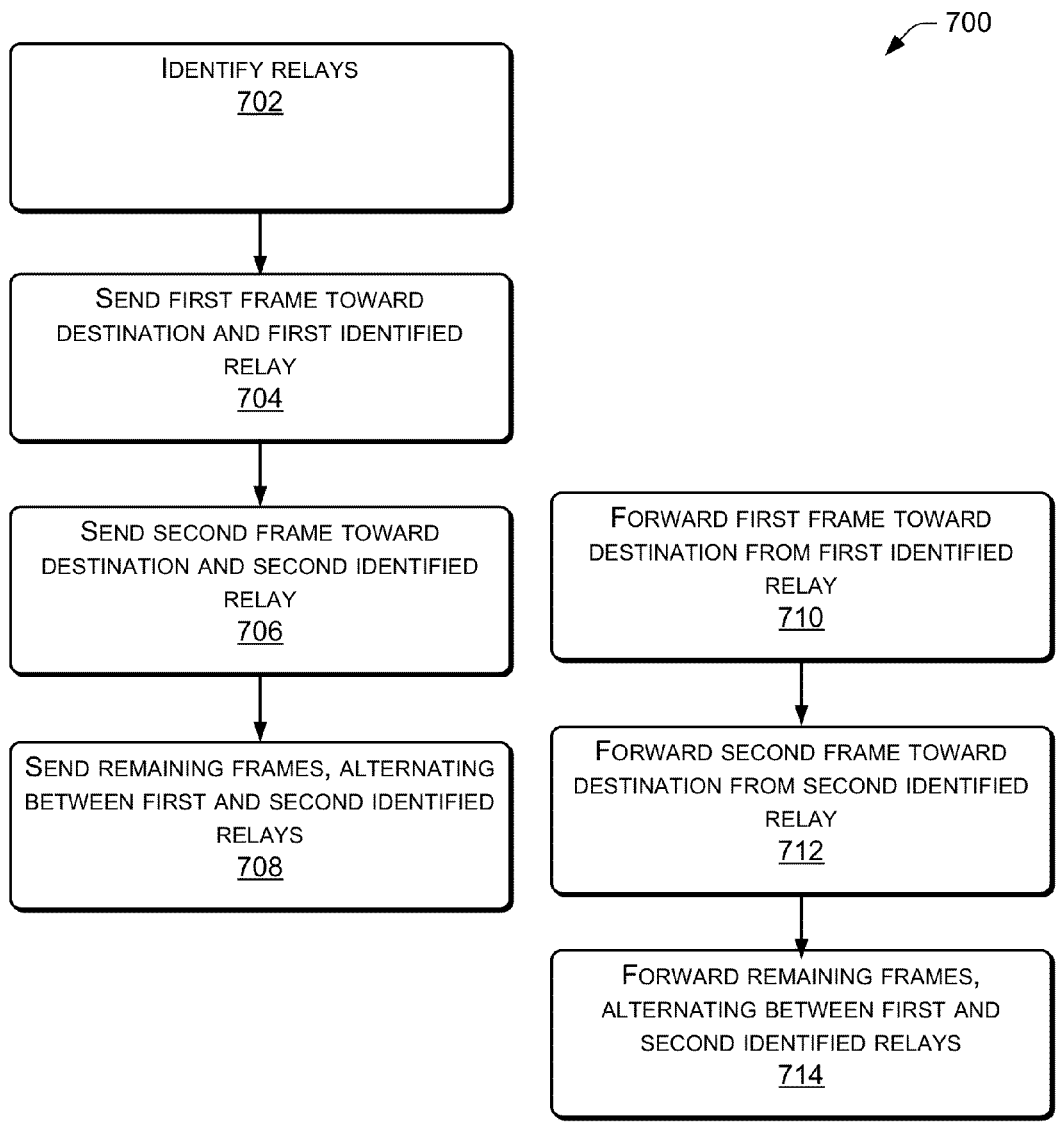
FIGS. 7-11 are flow diagrams illustrating an example process for cooperative relay in a wireless network in various embodiments.

FIG. 7 presents process 700, which includes, at 702, a sender such as sender 104A and/or sender 104E initiating a process employing a cooperative relay 106, such as a full-rate cooperative relay in a wireless network by identifying two or more relays 106 configured as cooperative relays located close to the sender 104 in a network 102.

At 704, the sender 104 encodes and sends a first frame transmission, F1, toward destination 202 and a first identified relay 106 such as 106A. Such a frame transmission includes a source frame transmission.

At 706, the sender 104 encodes and sends a second frame transmission, F2, toward destination 202 and a second identified relay, e.g., 106B.

At 708, the sender 104 repeats encoding and sending remaining source frames F3 . . . FN as at 704 and 706, alternating between the first identified relay 106A and the second identified relay 106E until each frame from a batch has been sent toward destination 202.

At 710, meanwhile, substantially simultaneous with 706, the first identified relay, e.g., 106A, forwards the first frame F1 on to a next hop toward the destination 202 without decoding the first frame F1.

At 712, meanwhile, substantially simultaneous with 708, the second identified relay, e.g., 106B, forwards the second frame F2 on to a next hop toward the destination 202 without decoding the second frame F2.

At 714, meanwhile, substantially simultaneous with the sender 104 repeating encoding and sending the remaining source frames as at 704 and 706, the first and second relays, e.g., 106A and 106E repeat forwarding frames as at 710 and 712. Consistent with 710 and 712, the frames are forwarded without decoding, with the forwarding alternating between the first identified relay 106A and the second identified relay 106B, until each frame from the batch has been sent toward the destination 202.

Figure 8:
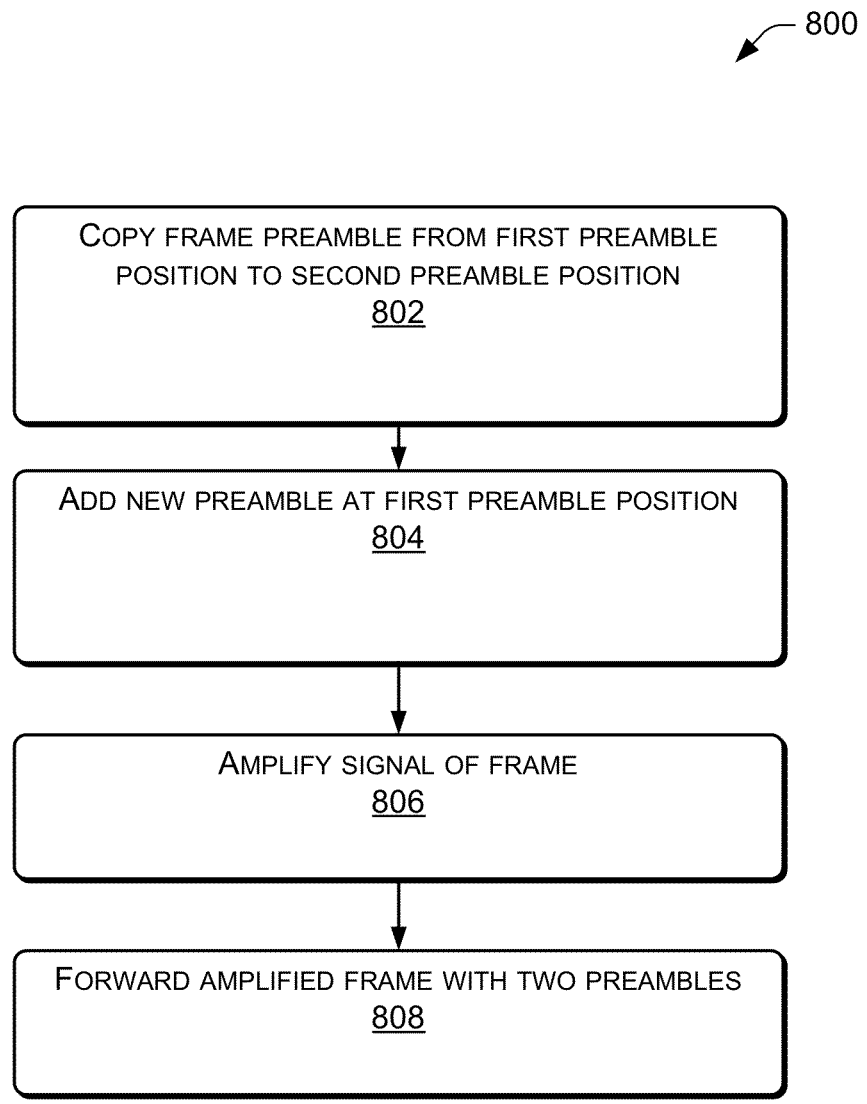

FIG. 8 presents the process 800, which in some instances represent 710, e.g., the first identified relay 106A forwarding the first frame, F1, on to a next hop toward the destination 202 without decoding the first frame, F1. Process 800 includes, at 802, relay 106A copying a frame preamble from a first preamble position to a second preamble position of frame F1.

At 804, relay 106A adds a new preamble at the first preamble position of frame F1. In various embodiments the new preamble is an interference-free full-power preamble.

At 806, relay 106A amplifies the signal of the first frame F1 without decoding the first frame F1.

At 808, relay 106A forwards the amplified first frame F1 with two preambles on to a next hop toward the destination 202.

Operations 802-808 are repeated by alternating relays (e.g., the first relay 106A and the second relay 106B) on the pair of relay paths until no frames remain in the batch from the source 104.

Figure 9:
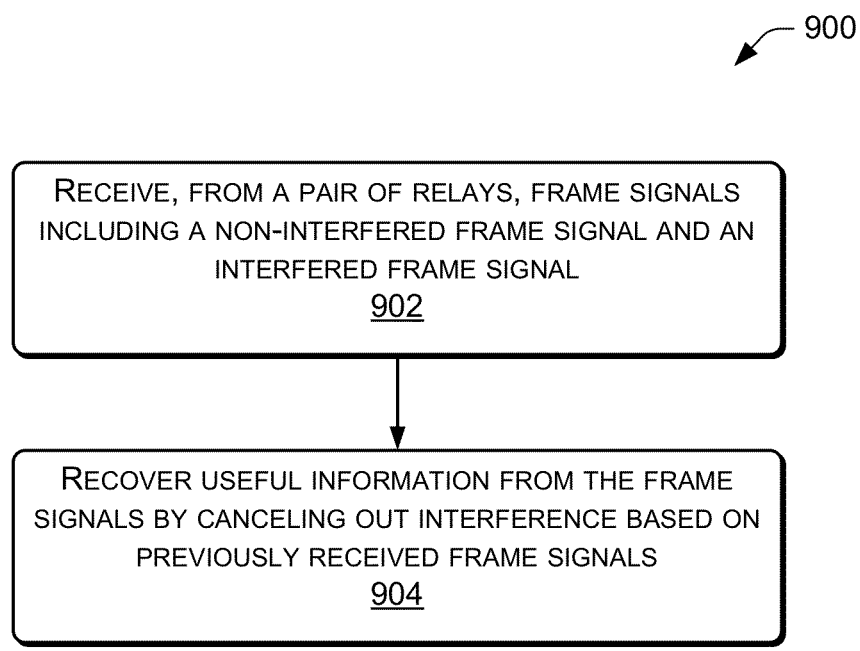

FIG. 9 presents the process 900, which includes, at 902, a destination 202 such as destination 104C, 104D and/or 104E initiating a process employing a cooperative relay such as a full-rate cooperative relay in a wireless network. In process 900, such a cooperative relay is initiated by destination 202 receiving from a pair of relays, e.g. 106A and 106B, frame signals such as those forwarded at 808 including a non-interfered frame signal and an interfered frame signal.

At 904, the destination 202 recovers useful information from the received frame signals by canceling out interference from the frame signals based on previously received frame signals.

Figure 10:
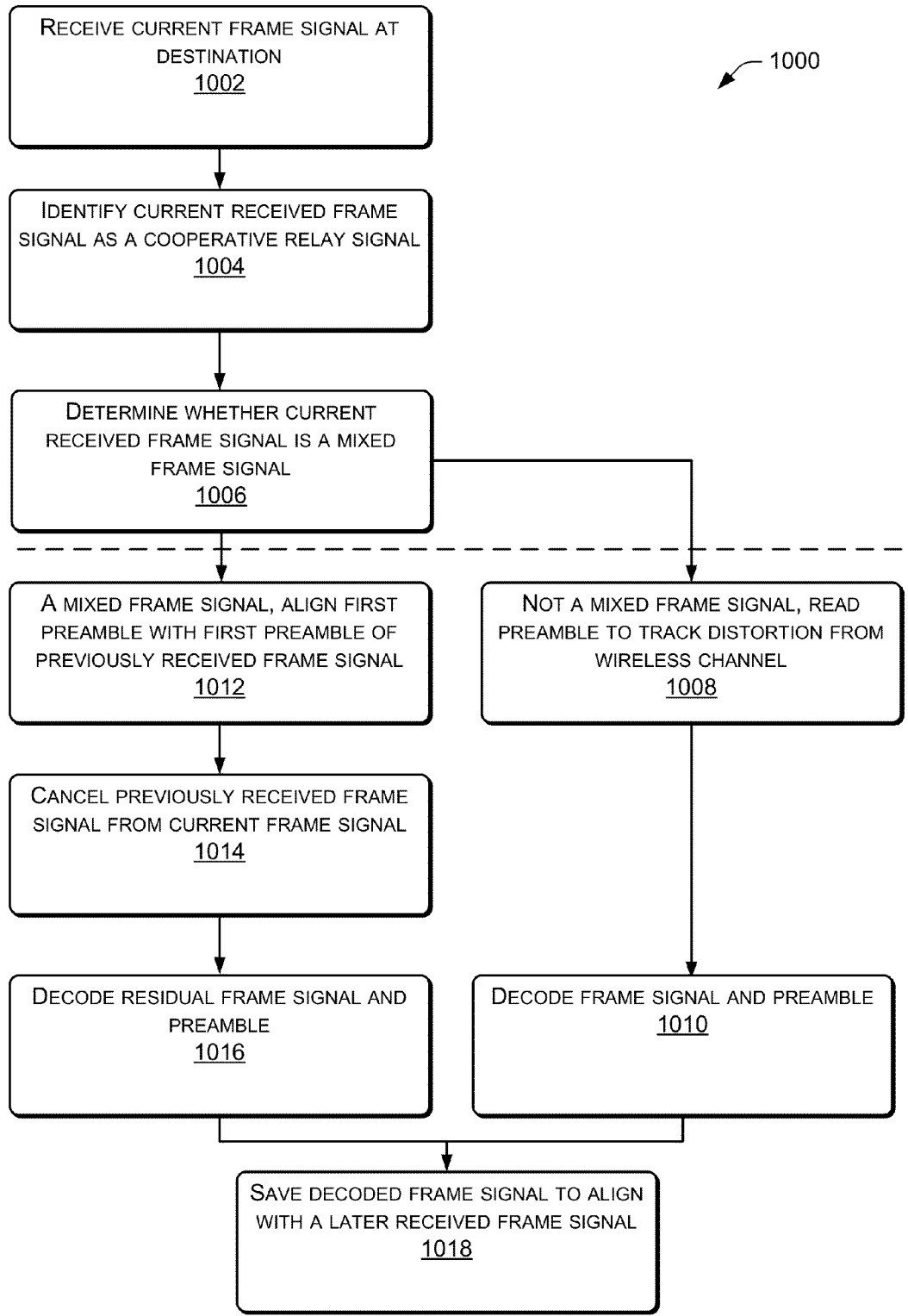

FIG. 10 presents the process 1000, which represents an alternate embodiment of at least a part of process 900 in various implementations. For example, in one embodiment operations 1002-1006, above the dashed line, replace 902. As another example, operations 1008-1018, below the dashed line, may replace 904.

The process 1000, includes at 1002 the destination 202 receiving a current frame signal such as the frame signal forwarded at 808.

At 1004, the destination 202 identifies the current received frame signal as a cooperative relay signal.

At 1006, the destination 202 determines whether the current received frame signal is a mixed frame signal.

At 1008, when the current frame signal is not a mixed frame signal, the destination 202 reads the preamble from the first preamble position to track wireless channel distortion.

At 1010, the destination 202 decodes the frame signal and preamble.

At 1012, when the current frame signal is a mixed frame signal, the destination 202 aligns the preamble from the first position of the current frame signal with the preamble from the first position of the previously most recently received frame signal.

At 1014, the destination 202 cancels the previously most recently received frame signal from the current frame signal to obtain a residual frame signal with a single preamble.

At 1016, the destination 202 decodes the residual frame signal and single preamble. Thus, 1016 results in a decoded frame signal consistent with the result at 1010.

At 1018, the destination 202 saves decoded frame signals to align with later received frame signals.

Figure 11:
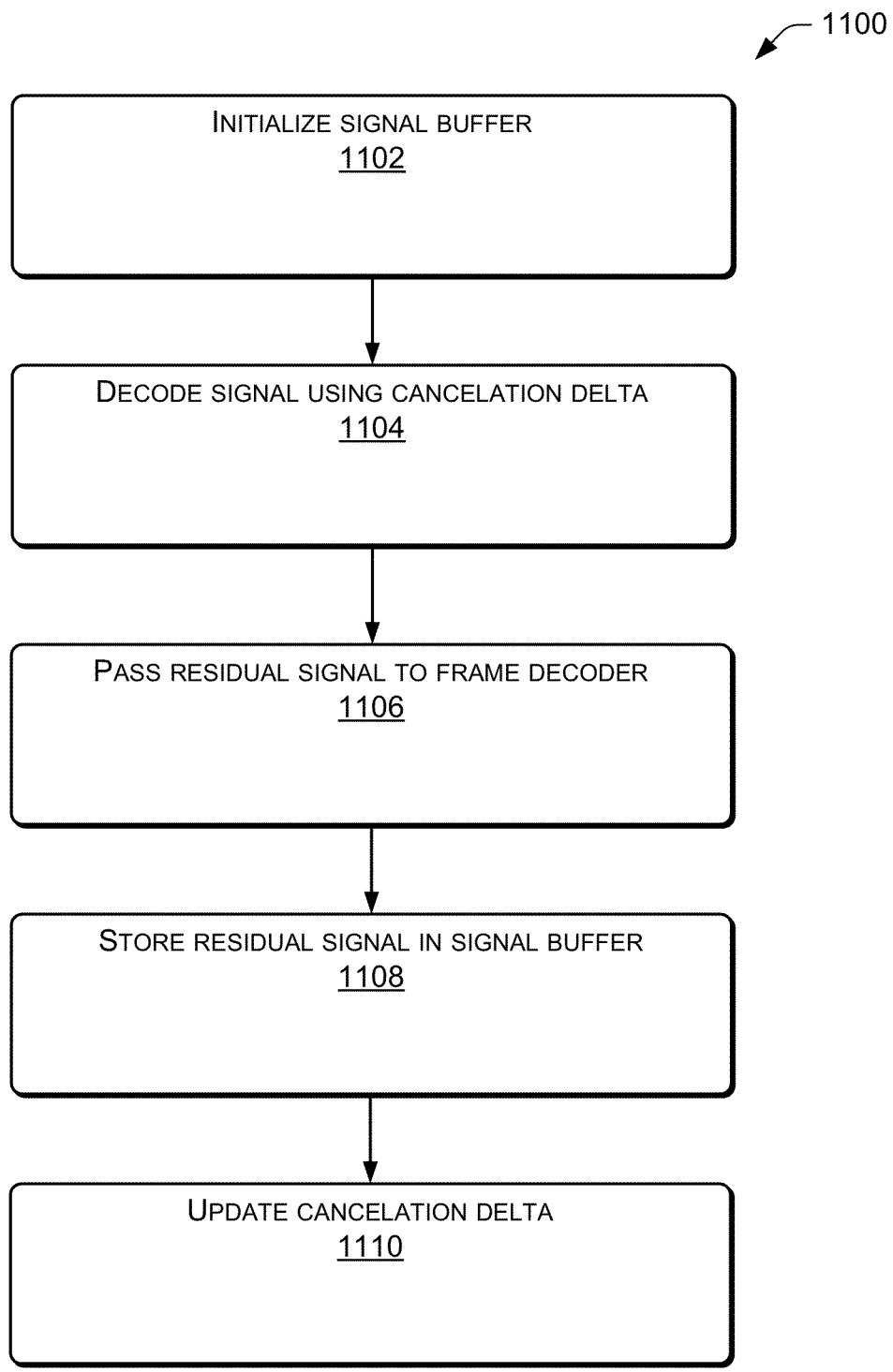

FIG. 11 presents the process 1100, which represents another alternate embodiment of at least a part of process 900 in various implementations implementing the FULPLEX decoding algorithm at a destination 202.

The process 1100, includes at 1102 the destination 202 initializing a signal buffer such as signal buffer 114. For example, the destination 202, allocates a signal buffer array in a signal buffer 114.

At 1104, the destination 202 decodes a new signal by recursively canceling the signal using a cancelation delta stored in the signal buffer 114. For example, when a new signal is received such as from relays 106, the destination 202 cancels the signals stored in its buffer 114.

At 1106, the destination 202 passes the residual signal to a frame decoder 118(2). For example, the residual signal is passed to frame decoder 118(2), which in some instances represents a conventional frame decoder.

At 1108, the destination 202 stores the residual signal in the signal buffer 114. For example, destination 202 stores the residual signal in a signal buffer array in signal buffer 114 that, at least in some instances, stores the intermediate decoding results of the previous two time slots.

At 1110, the destination 202 updates the cancelation delta. For example, different wireless channels will distort and attenuate the same signal differently. Thus, the cancelation delta is updated rather than canceling two received versions of the same signal directly.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage devices storing computer-executable instructions that, when executed by one or more processors, configure the one or more processors to perform acts comprising:

receiving, at a first relay, a first frame transmission from a source being sent toward a destination;

forwarding, from the first relay toward the destination and toward a second relay, the first frame transmission;

receiving, at the second relay, the first frame transmission forwarded from the first relay interfered with a second frame transmission received from the source;

generating an encoded frame transmission comprising the first frame transmission interfered with the second frame transmission; and forwarding, from the second relay toward the destination, the encoded frame transmission without decoding the interfered frame transmission.

2. The one or more computer-readable storage devices as recited in claim 1, wherein the one or more acts further comprise:

receiving, at the destination, the first frame transmission forwarded from the first relay;

receiving, at the destination, the encoded frame transmission; and decoding, at the destination, the second frame from the encoded frame transmission, wherein said decoding is based on the first frame transmission received from the first relay.

3. The one or more computer-readable storage devices as recited in claim 1, wherein the one or more acts further comprise:

the receiving the first frame transmission occurs during a first time frame;

the forwarding the first frame transmission toward the destination and the receiving the first frame transmission forwarded from the first relay interfered with the second frame transmission received from the source occur during a second time frame; and the forwarding the encoded frame transmission occurs during a third time frame.

4. The one or more computer-readable storage devices as recited in claim 1, wherein the first and second frame transmissions are substantially continuous within a batch.

5. The one or more computer-readable storage devices as recited in claim 1, wherein the the first and the second relays are configured as cooperative relays.

6. The one or more computer-readable storage devices as recited in claim 1, wherein the first and second relays are configured to attach a new preamble to received frame transmissions.

7. The one or more computer-readable storage devices as recited in claim 1, wherein the first and second relays are configured to amplify received frame transmissions.

8. The one or more computer-readable storage devices as recited in claim 1, wherein the one or more acts further comprise tagging the frame transmissions with a new preamble at each hop to record channel state.

9. The one or more computer-readable storage devices as recited in claim 1, wherein a first distance between the source and the first relay and a second distance between the source and the second relay are such that the second relay receives the second frame transmission from the source within a same time frame as receiving the first frame transmission from the first relay.

10. The one or more computer-readable storage devices as recited in claim 1, wherein the one or more acts further comprise iteratively decoding, at the destination, a plurality of frame transmissions based on the first frame transmission received from the relay.

11. A method, comprising:

receiving, at a destination and from a pair of relays, frame signals comprising at least a non-interfered frame signal and an interfered frame signal; and recovering, by the destination, useful information from the frame signals by canceling out interference with use of previously received frame signals including the received non-interfered frame signal and the received interfered frame signal, and wherein recovering the useful information from the frame signals further comprises:

aligning a portion from a currently received frame signal with a portion from a previously received frame signal, canceling the previously received frame signal from the currently received frame signal to obtain a residual frame signal, decoding the residual frame signal, and saving the residual frame signal to align with a later received frame signal.

12. The method as recited in claim 11, wherein the receiving comprises receiving a batch of n frames signals in n−1 time slots.

13. The method as recited in claim 11, further comprising:

determining a type of a particular frame signal, wherein types of frame signals include non-interfered frame signals and interfered frame signals formed from mixed frames;

in an event the particular frame signal is a non-interfered frame signal, reading a preamble of the particular frame signal to track distortion from a wireless channel; and in an event the particular frame signal is an interfered frame signal, canceling a frame signal from the particular frame signal, wherein the frame signal is received prior to the particular frame signal.

14. The method as recited in claim 11, wherein the receiving further comprises:

identifying the frame signals received as cooperative relay signals;

determining a type of a particular cooperative relay signal, wherein types of particular cooperative relay signals include non-interfered frame signals, and interfered frame signals formed from mixed frames.

15. The method as recited in claim 11, wherein receiving the frame signals further comprises receiving the non-interfered frame signal from a first relay of the pair of relays.

16. The method as recited in claim 11, wherein the portion from the currently received frame signal is a first preamble;

wherein the portion from the previously received frame signal is a second preamble;

wherein canceling the previously received frame signal from the currently received frame signal further comprises obtaining a residual preamble; and wherein decoding the residual frame signal further comprises decoding the residual preamble.

17. The method as recited in claim 11, wherein distances between the source, the first relay, and the second relay are such that the second relay receives the second frame transmission from the source within a same time frame as receiving the first frame transmission from the first relay.

18. The method as recited in claim 11, further comprising iteratively decoding, at the destination, a plurality of frame transmissions, wherein iterations except a first iteration are based on one or more decoded frame transmissions from a previous iteration, and wherein the first decoding is based on a first frame transmission received from the relay.

19. A system, comprising:
at least one processor; and
one or more memory devices to store instructions that, when executed by the at least one processor, cause a computing device to:
identify two or more relays configured as cooperative relays;
transmit a batch of n frames toward a destination using two one-way flow multi-hop paths;
transmit a first frame of the n frames to a first relay of the two or more relays;
schedule a transmission of a second frame of the n frames to a second relay such that the second relay receives an encoded transmission, wherein the encoded transmission comprises a transmission of the second frame interfered with a transmission of the first frame from the first relay; and
transmit, according to the schedule, the second frame of the n frames to the second relay.

20. The system of claim 19, wherein the instructions stored on the one or more memory devices further cause the computing device to repeat, for each remaining frame of the n frames, scheduling of a transmission, and transmitting the transmission according to the schedule, such that the n frames are transmitted in (n+1) time slots.

* * * * *